Feb. 2, 1937. R. H. CHILTON 2,069,195
RAPID FREEZING DEVICE
Filed April 30, 1934 4 Sheets-Sheet 2

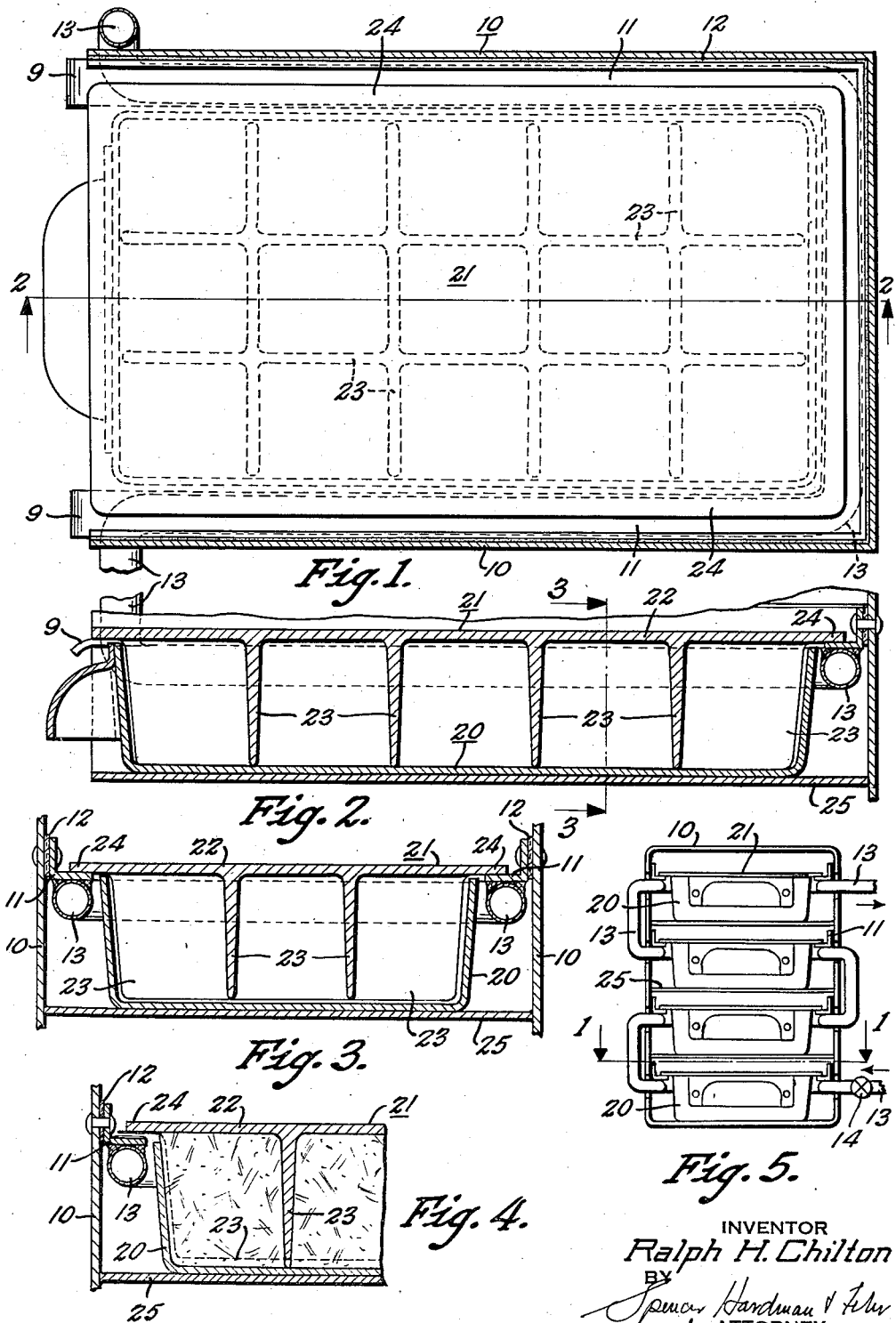

INVENTOR
Ralph H. Chilton
BY
Spencer Hardman & Film
his ATTORNEYS

Feb. 2, 1937.  R. H. CHILTON  2,069,195
RAPID FREEZING DEVICE
Filed April 30, 1934  4 Sheets-Sheet 3

INVENTOR
Ralph H. Chilton
BY
Spencer Hardman & Felue
his ATTORNEYS

Feb. 2, 1937.  R. H. CHILTON  2,069,195
RAPID FREEZING DEVICE
Filed April 30, 1934  4 Sheets-Sheet 4

INVENTOR
Ralph H. Chilton
BY
Spencer Hardman & Fehr
his ATTORNEYS

Patented Feb. 2, 1937

2,069,195

UNITED STATES PATENT OFFICE 2,069,195

RAPID FREEZING DEVICE

Ralph H. Chilton, Dayton, Ohio, assignor to General Motors Corporation, Detroit, Mich., a corporation of Delaware Application April 30, 1934, Serial No. 723,029

15 Claims. (Cl. 62—108.5)

This invention relates to freezing devices, especially such as are adapted for use in domestic refrigerators to produce small ice blocks for table use.

This invention comprises both the improved form or forms of freezing containers described herein and the improved arrangement and method for transferring heat from the containers to the refrigerant whereby more efficient and rapid freezing of the container contents is obtained.

A general feature of the invention is the provision of high heat-conducting grid or cover members for the containers, which members have greatly improved heat-transfer relationship with the stationary refrigerated member or surface of the cooling unit of the refrigerator. Another feature of the invention is the provision of laterally extending projections or flanges on the grid or cover member which engage in good heat-transfer contact stationary supporting ledges on the side walls or other surfaces of the freezing chamber. A separate shelf or support for the container pan may be used for even greater rapidity of freezing or, if desired, the container may also be supported dependingly by said ledges or by the grid or cover member itself. By thus providing a better and more direct heat-transfer path from the water in the container to the refrigerant itself the rapidity of freezing is greatly increased.

Another feature of the invention is the arrangement of a refrigerant duct within or adjacent the freezing chamber in such manner that practically all, or at least the greater part, of the refrigerating effect from said duct goes first towards freezing the liquid contents of the container; in other words, the freezing of the liquid contents has first call upon the refrigerating effect of the refrigerant in a certain duct. After the refrigerant in this certain duct has performed its prime function of freezing the liquid contents it may then use its full effect in performing the general function of cooling other areas or parts of the refrigerator, as desired. This feature of the invention is illustrated particularly in Figs. 1 to 5.

Another feature of the invention is the means for causing the expansion of the ice upon freezing to lift the grid or cover member upwardly out of contact with or loosen its frozen bond with its supporting ledge or other surface, whereby removal of the freezing device from the chamber is facilitated. In the forms of the invention where the grid or cover member has metal to metal contact with its refrigerated surface it will ordinarily bond tightly thereto by frost during the first part of the freezing operation and thus provide a good heat-transfer path, but as the ice expands upon freezing it will force the grid or cover member upwardly and break it loose from such frozen bond and thereby permit its easy removal. In the forms of the invention where the grid or cover member has a metal to water or ice contact with its refrigerated surface the action will be substantially the same as above described. In the forms of the invention where the grid or cover member dips into a non-freezing liquid film (such as brine or mercury) carried upon its refrigerated surface, this metal to liquid contact will give a very efficient heat-path until the ice expands upon freezing whereupon the grid or cover member will be lifted clear of the non-freezing liquid and such liquid will drain off the previously wetted metal edge, whereby messiness is avoided when the container is removed from the freezing chamber.

Various other features of the invention relate to the easy removal of the ice blocks from the freezing containers after the containers are removed from the freezing chamber, as more fully described herebelow in connection with the various forms of the invention. With some forms of the invention no melting is necessary to properly free the ice blocks from the container, such as in the form illustrated in Figs. 13 to 17. With some forms of the invention it is preferable to thaw the frozen bond of the ice with either the container pan or the top member, such thawing being greatly facilitated by the integral metal partition members on such member. In the forms of the invention shown in Figs. 5, 10, 12, 20 and 22, the expansion of the ice during freezing forces the upper grid member upwardly and substantially loosens the tapered partition members from the ice blocks and thereby facilitates the removal of the ice blocks therefrom, this being true whether or not it is necessary or preferable to melt the ice free from the lower or container member.

Further objects and advantages of the present invention will be apparent from the following description, reference being had to the accompanying drawings, wherein a preferred embodiment of the present invention is clearly shown.

In the drawings:

Figs. 1 to 5 show one form of the invention wherein:

Fig. 1 is a plan view taken on line 1—1 of Fig. 5;

Fig. 2 is a section taken on line 2—2 of Fig. 1;

Fig. 3 is a section taken on line 3—3 of Fig. 2;

Fig. 4 is similar to Fig. 3 but shows how the expansion of the ice has lifted the grid member clear of its supporting ledge;

Fig. 5 is a somewhat diagrammatic view illustrating an arrangement of a refrigerant duct and freezing containers so that the freezing of the liquid contents has first call upon the refrigerant in this duct.

Figs. 7 to 10 show another form of the invention wherein:

Fig. 7 is a transverse section through the container;

Fig. 8 is a section on line 8—8 of Fig. 7;

Fig. 9 is a view similar to Fig. 8 and illustrates how the depending flanges on both the container and grid member are supported clear above the liquid on the supporting ledge during insertion and removal of the container.

Fig. 10 is similar to Fig. 7, but shows how the expansion of the ice has lifted the grid member upwardly relative to the container and clear of the liquid on the supporting ledge.

Figs. 11 and 12 show another form of the invention wherein:

Fig. 11 is a transverse section through the container before freezing of the contents;

Fig. 12 is similar to Fig. 11 but shows the effect of the expansion of the ice in lifting the grid member.

Figs. 13 to 17 show another form of the invention wherein:

Fig. 13 is a transverse section through the container;

Fig. 14 is a view similar to Fig. 9, and illustrates how the grid member is cammed upwardly and supported above the liquid on the side ledges while the container is being slid into or out of its freezing position;

Fig. 15 illustrates how the flexible rubber container pan may be stripped from the ice while it is held upon the grid member to facilitate the removal of the ice without melting;

Fig. 16 illustrates how the metal grid member may be flexed to loosen the ice blocks therefrom to facilitate their removal without melting.

Fig. 17 is a plan view of the flexible metal grid member with the ice all removed.

Figs. 18 to 20 show another form of the invention wherein:

Fig. 18 is a plan view similar to Fig. 1;

Fig. 19 is a section on line 19—19 of Fig. 18;

Fig. 20 is similar to Fig. 19 but shows the effect of the expansion of the ice in lifting the separate grid member.

Figs. 21 and 22 show another form of the invention wherein:

Fig. 21 is a longitudinal section through the container and flexible upper grid member;

Fig. 22 is a section on line 22—22 of Fig. 21 and shows the effect of the expansion of the ice in partially lifting the upper grid member.

Similar reference characters refer to similar parts throughout the several views.

Figure 6:
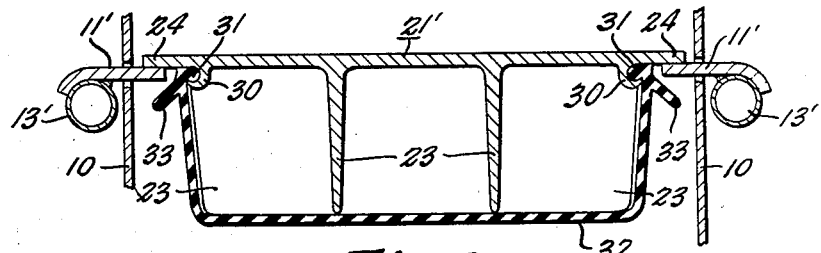
Fig. 6 is a transverse section through the container in another form of the invention.
Figure 7:
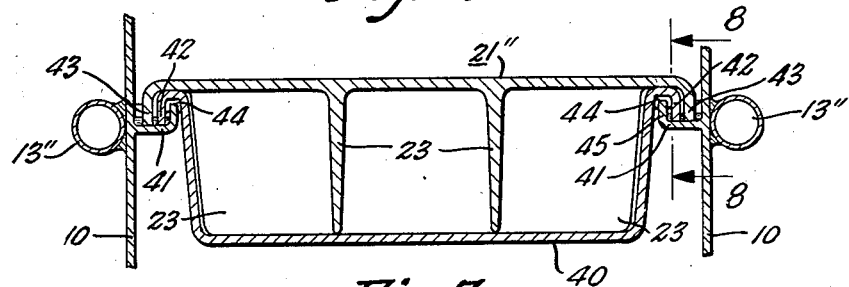

In Figs. 1 to 5, the sides 10 of the freezing chamber have a series of metal ledges 11 supported thereupon in any suitable manner, preferably by having a layer of heat-insulating material 12 interposed therebetween so that practically all the cooling effect of the refrigerant duct 13 will be applied to the freezing tray elements which contact the ledges 11. The refrigerant duct 13 is shown in Fig. 5 as entering the freezing chamber immediately after the refrigerant passes the expansion valve 14. Duct 13 then passes successively around each metal ledge 11, it being suitably fixed to the under side of these ledges 11 in good heat-transfer contact therewith in order to provide the maximum heat conductivity between the refrigerant and the freezing container part which contacts said ledges 11. Preferably the refrigerant in duct 13 enters the freezing chamber at the lowest tray and passes out at the topmost tray (as shown in Fig. 5), after which the refrigerant may pass on to other cooling coils or units in the refrigerator before it is led back to the compressor. It is thus seen that the first call upon the refrigerant in duct 13 will be to freeze any unfrozen liquid in the series of freezing containers, but that after such liquid is frozen and can give up little or no further heat to duct 13 the cooling effect of this refrigerant will be substantially fully available for any other desired refrigeration purposes after it leaves the freezing chamber at the upper exit end of duct 13. This is one of the features of this invention and is applicable to each of the forms of the invention shown or described hereinbelow.

The removable freezing tray comprises a container pan 20 and a separate metal grid member 21 having a cover 22 and integral partition walls 23, preferably of a good heat-conducting metal. Grid 21 has projecting flanges 24 extending around its two sides and rear end so that when the filled tray is inserted within the freezing chamber these flanges 24 will rest directly upon and be supported by the metal ledges 11 and have a substantial area in direct heat-transfer contact therewith. The pan 20 is supported upon the stationary refrigerated shelf 25 and obviously may have a large area in good heat-transfer contact therewith (as shown) to further enhance rapidity of freezing.

In operation, the pan 20 is filled with water and the grid 21 inserted within the pan with the flanges 24 projecting laterally beyond the pan walls, as shown. This unit is then simply slipped into place upon its shelf 25 but during such insertion the flanges 24 first engage and slide upon the supporting ledges 11 so that when the tray reaches its final freezing position (shown in Figs. 1 to 3) the weight of the grid 21 rests directly upon the surrounding ledges 11. In order to facilitate the initial insertion of the unit and prevent possible abutment of the flange 24 against the front edges of ledges 11, these front edges may be turned downward a slight amount as clearly shown at 9 in Figs. 1 and 2. Heat is very rapidly conducted from the water in pan 20 due to the fact that the full area of all the partition walls 23 collects the heat from the water, so to speak, whence the heat is conducted by a perfect metal path directly to the very cold ledges 11 and thence to the refrigerant in duct 13. Of course the contact area between flanges 24 and ledges 11 can be made as great as desired by an increased width thereof but the overlap shown is sufficient for a highly effective heat path. A film of frost or ice is normally present on the ledges 11. Hence when the relatively warm flanges 24 first rest thereupon this film of ice is first melted thereby and then quickly refrozen so that the heat path from flanges 24 to ledges 11 is improved by this frozen bond therebetween. Since the ledges 11 extend in a horizontal plane this bonding film of ice will ordinarily be of very small thickness, but will normally be present to such extent as to provide the desired frozen bond. When the water in pan 20 freezes solid, the accompanying expansion of the ice will force the grid 21 upwardly and lift the flanges 24 from the ledges 11 and thereby break loose the frozen bond therebetween, as shown in Fig. 4. Obviously such automatic releasing of this frozen bond between the grid 21 and the stationary ledges 11 will greatly facilitate the subsequent removal of the tray and contents. If pan 20 is of flexible rubber or flexible metal it may be easily broken free and slid out due to its distortable bottom. If pan 20 is of quite rigid metal its bottom may be broken free from its frosted bond to shelf 25 by hand or by any suitable camming or prying means now in general use.

Fig. 6 shows a form of the invention which is similar to and provides rapid freezing similar to that above described, but with this form no shelf support for the pan is required. The grid member 21' has depending grooved projections or flanges 30 into which the upper edges 31 of the flexible rubber pan 32 may be easily pressed by hand so that the weight of the filled pan 32 will be properly sustained. In this form practically all the heat is transferred from the water through grid 21', metal ledge 11', and refrigerant duct 13' since the rubber pan 32 is a relatively poor heat conductor. The tray and its frozen contents may be freed from the supporting ledges 11' by hand by a slight twisting or by any added suitable camming or prying means which are now well known and hence not illustrated in the drawings. After removal of the tray and contents the flexible rubber pan 32 may be easily stripped from the ice by first pulling the beaded edges 31 from the projections 30 on grid 21' by grasping the suitable finger tabs 33 provided for this purpose. Another and perhaps better way of removing the ice blocks is to flow a little warm water over the top plate of grid 21' thereby causing it to be very quickly thawed loose from the ice due to the partitions 23 being integral with the top plate, whereupon the grid 21' may be simply lifted from the ice and leave the ice stuck in the pan 32 due to the fact that the warm water will not so quickly thaw the bond between the ice blocks and the rubber pan and may not even contact the rubber pan 32. The ice blocks may then be easily removed from the pan one at a time or as needed, or they may be stored in pan 32, with the grid 21' removed, for later use. By this method of removal no warm water can touch the ice and hence there will be no wasteful melting of the ice.

Figure 9:
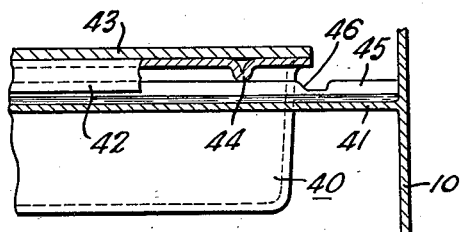
Figure 8:
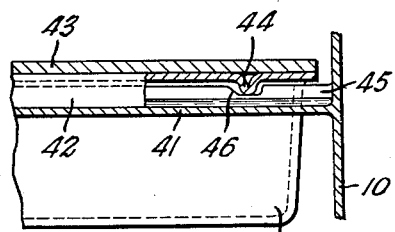
Figure 10:
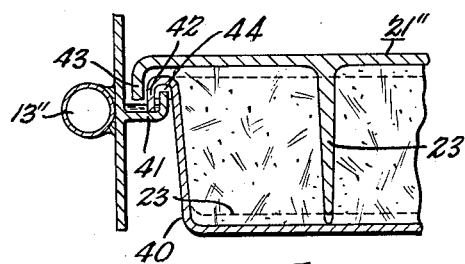

Figs. 7 to 10 show a form of the invention similar to that of Figs. 1 to 4 in providing rapid freezing, but differs in that both the metal pan 40 and the removable metal grid 21'' are suspended from the stationary refrigerated channel-shaped ledges 41. These ledges 41 preferably contain a shallow pool of ice or anti-freeze liquid such as brine or mercury in order to provide a more perfect heat path from the ledge to the contacting depending flanges 42 and 43 on the pan 40 and grid 21'' respectively. If water ice is used in the channel ledges 41 it will first be partially melted when the relatively warm tray is inserted in place and quickly refrozen to provide the improved ice-bonded heat path from the ledge 41 to the contacting flanges 42 and 43, as described above in connection with Figs. 1 to 4. If a non-freezing liquid, as brine or mercury, is used in the channel ledges 41 a substantially perfect heat path is obtained without any frozen bond between the contacting metal parts and hence removal of the tray and contents after freezing is greatly facilitated. The depth of brine or mercury may be very small and still provide an excellent heat path to the flanges 42 and 43. Preferably a small downward projection 44 is provided on the under side of each of the pan flanges 42 so that said projections 44 will ride on top of the upstanding inner wall 45 of the channel ledges 41 while the tray is being slid into place to its freezing position, as clearly shown in Fig. 9. This keeps the flanges 42 and 43 lifted clear of the liquid in the channel ledges 41 during insertion or removal of the tray. But after the tray reaches its freezing position, as shown in Fig. 8, the projection 44 rides down into a cam recess 46 in the inner wall 45 of ledge 41 and so permits the flanges 42 and 43 to lower and fully contact the liquid in the channel ledges 41. Upon withdrawal of the tray, the initial reverse motion causes projection 44 to ride up on the cam 46 and then slide along the top edge of wall 45 as shown in Fig. 9, so that during both insertion and withdrawal of the tray the flanges 42 and 43 are out of contact with the liquid in the channel ledges 41. This feature aids greatly in avoiding messiness by preventing splashing or surging of the liquid and by preventing withdrawal of the tray with the liquid still dripping from the flanges 42 and 43. Furthermore, this initial upward camming of flanges 42 and 43 will easily break them free from any frozen bond with the ledges 41 which will always be present when water is used in these channels, and may be present when a non-freezing liquid is used therein due to an accumulation of condensed moisture which may float upon the mercury or other non-miscible anti-freeze liquid. After removing the tray from the refrigerator, a small amount of warm water may be flowed over the grid 21'' to quickly melt its bond to the ice but without any water touching the ice or even the outside of pan 40, whereupon the grid may be simply lifted from the ice blocks which are left stuck in pan 40 as described above in connection with Fig. 6. The separated ice blocks may be then easily removed by a very slight flexing of the metal pan 40, or they may be stored in the pan 40 for subsequent easy removal as needed.

Figure 12:
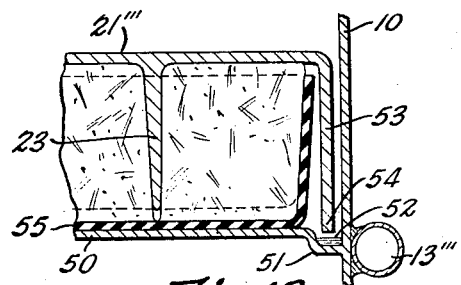
Figure 11:
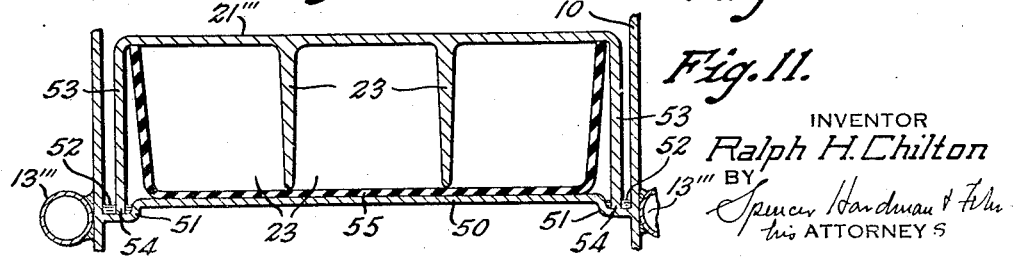

Figs. 11 and 12 show a form of the invention wherein the refrigerated shelf support 50 has side grooves or depressions 51 containing a shallow pool of water ice or anti-freeze liquid 52. The grid member 21''' has integral partitions 23 as above described and also wide depending side flanges 53 adapted to contact the bottoms of grooves 51 or at least contact the liquid or ice in these grooves. Thus rapid freezing will be obtained by the good heat path from refrigerant ducts 13''' up through side flanges 53 directly to the partitions 23, this very effective heat transfer being in addition to whatever heat transfer may occur due to the bottom of pan 55 resting directly upon the cold shelf 50. If desired pan 55 may be of flexible rubber or other flexible non-metallic material to facilitate removal of the ice blocks, in which case the usual poor rate of heat transfer through the non-metallic pan 55 is more than compensated for by the high rate of heat transfer directly through the grid member 21'''. If desired pan 55 may be of a good heat-conducting metal, in which case an extremely rapid rate of heat transfer will occur as will be obvious. When the filled ice tray is first inserted in its freezing position the weight of grid 21'''' will cause the lower edges 54 of flanges 53 to first melt the layer of ice which may be present in grooves 51, which layer of ice will be quickly refrozen and form a good heat-transferring frozen bond to flanges 53. If the shallow pool 52 consists only of mercury or other non-freezing liquid the metal edges 54 will immediately contact same and the highly effective heat path results immediately, all as described above in greater detail in connection with Figs. 7 to 10. Fig. 12 illustrates how the ice expands upon freezing and since it cannot move the pan 50 downward it will force the grid 23''' upward and thus lift the edges 54 of side flanges 53 from the liquid or ice pool 52, or at least break the frozen bond between edges 54 and whatever ice may be present and forming such a frozen bond. Some of this normally present ice will ordinarily stick to the edges 54 and be removed from the grooves 51 each time the tray is removed from the refrigerator, and thus an over accumulation of condensation ice or frost in grooves 51 will be avoided. The ice blocks may be taken from the removed tray in any manner described above in connection with the previously described forms of the invention.

Figure 13:
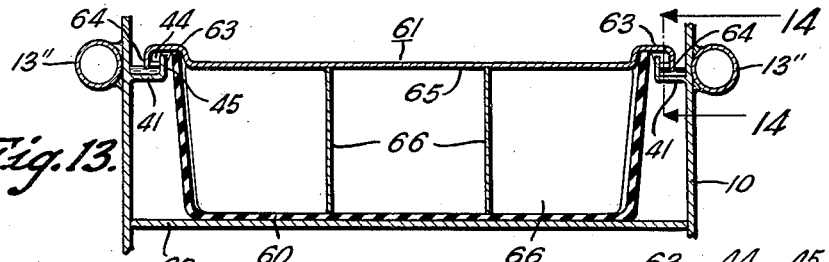
Figure 14:

Figs. 13 to 17 show a form of the invention having a flexible rubber or other flexible pan 60 supported upon a shelf 62 and a flexible metal grid member 61 having a direct heat transfer path to the liquid or ice retaining channel ledges 41 which are similar in construction and operation to the ledges 41 described in detail above in connection with Figs. 7 to 10. The grid 61 has overhanging and depending side flanges 63 whose lower edges 64 contact the ice or non-freezing liquid in ledges 41 to provide rapid heat transfer from the water in the rubber pan 60. These flanges 63 each has a small projection 44 which slides upon the top edge of inner wall 45 of channel ledge 41 during the insertion or withdrawal sliding movement of the tray and rests within the cam recess 46 in wall 45 when the tray is in freezing position, all for the purposes fully described above and as shown in Figs. 13 and 14. Preferably the top cover plate 65 of grid 61 is depressed on the inside of the walls of pan 60 sufficiently to contact directly with the surface of the water when pan 60 is filled to the normal water level therein, as illustrated in Fig. 13. This feature provides a greater heat-transferring surface on grid 61 in direct contact with the water and hence accelerates rapidity of freezing. Obviously this feature of a depressed top cover plate to directly contact the water may be applied to any of the other forms of the invention herein disclosed.

Figure 15:
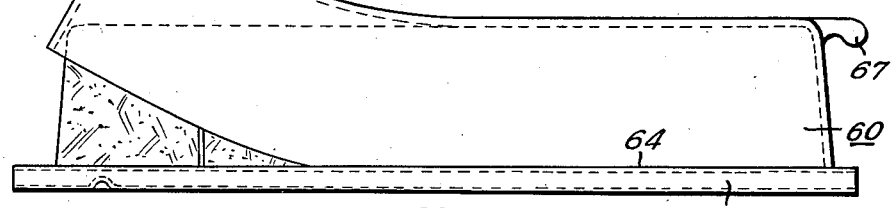
Figure 16:
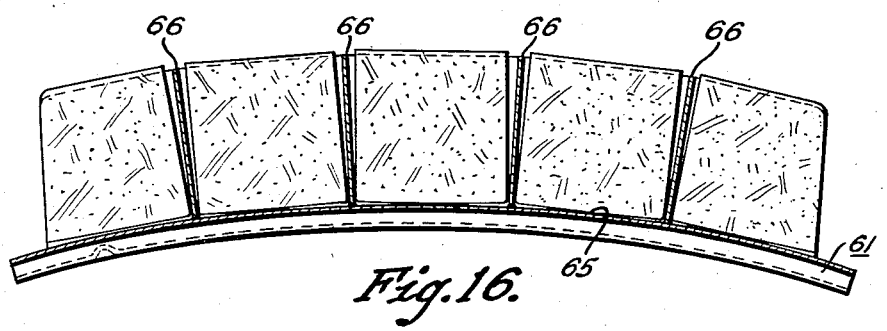
Figure 17:
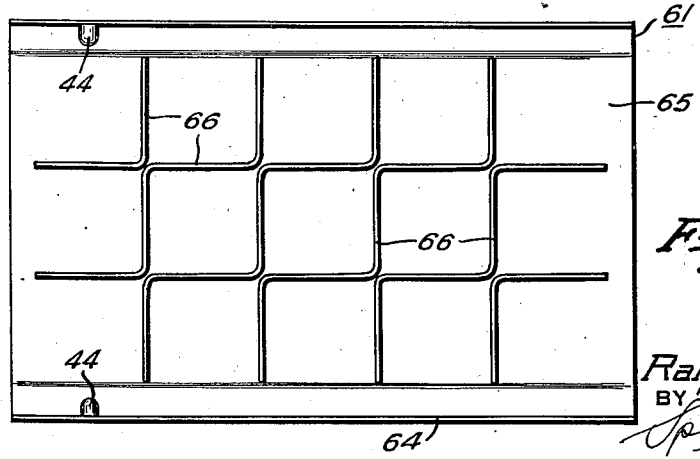

In operation, the filled tray including the assembled grid and pan is slipped to its freezing position in the freezing chamber, whereupon the good heat path from the refrigerated ledges 41 directly to the various partitions 66 in large surface area contact with the water gives rapid cooling. Of course some additional cooling effect is had through the bottom wall of the flexible rubber pan 60 which contacts shelf 62. Upon the easy removal of the tray and its frozen contents, the flexible elastic pan 60 may be easily stripped from the ice and grid 61 without any melting, as illustrated in Fig. 15, by pulling upon the integral finger tabs 67 suitably provided for this purpose. Then, since grid 61 has no stiffening side walls and the ice mass is not confined at all on its outer sides, the entire flexible grid 61 may be easily distorted by bending it backwardly as shown in Fig. 16, or by otherwise twisting or distorting it, to break the frozen bond between the ice blocks and the metal partitions 66. The ice blocks may then be either all dumped out or picked out with the fingers one at a time, or as needed. The metal partitions 66 are preferably quite springy so that they cannot easily be bent permanently out of shape, and are preferably made of separate strips of sheet metal bent to zig-zag form and permanently welded or fixed to the metal cover plate 65, as shown in Fig. 17. This form of flexible metal grid is claimed in my copending application Serial No. 580,864, filed December 14, 1931, Patent No. 2,011,849, Aug. 20, 1935. Of course any other suitable form of removable flexible metal grid having partitions in good heat conductivity relation with the overhanging side flanges may be used with this invention, in particular the other forms of flexible grids disclosed in the above prior application. Such further forms of flexible metal grids are not illustrated in the drawings since such showing would unduly complicate this disclosure. If desired, the partitionless plain pan 60 may be of flexible sheet metal with corrugated or folded expansible corners which corners will yield sufficiently to permit the metal pan 60 to be distorted by twisting same to loosen it from the solid ice contents whereupon it may be lifted from the mass of ice which remains in the grid 61. The grid 61 may then be flexed to remove the individual ice blocks as described above.

Figure 18:
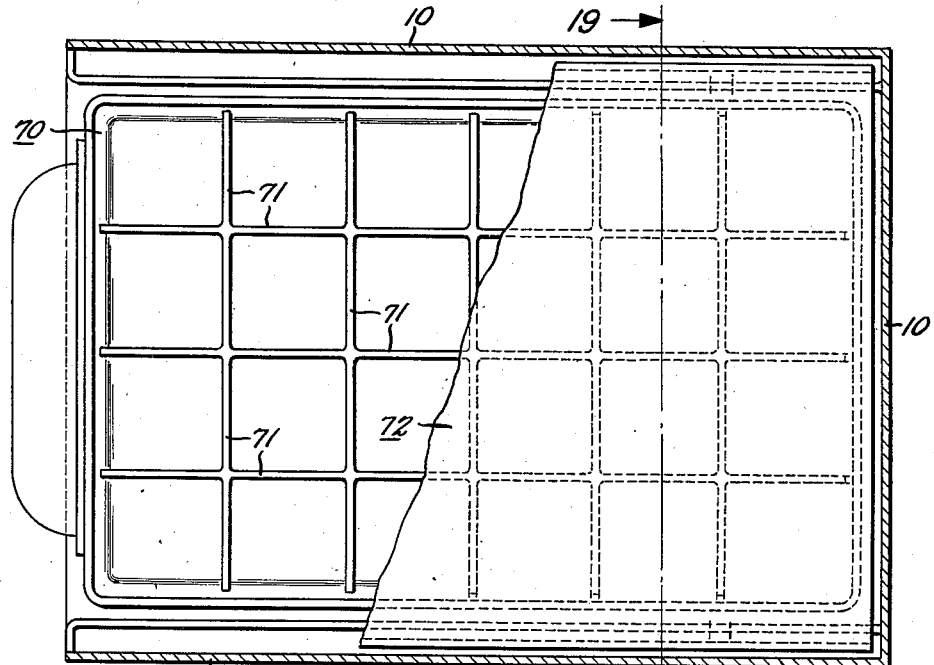
Figure 19:
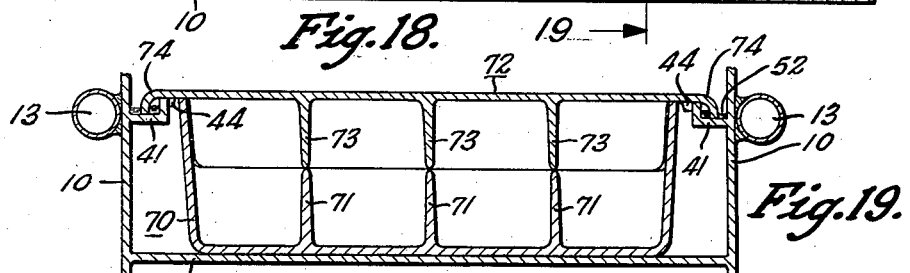
Figures 20, 22:
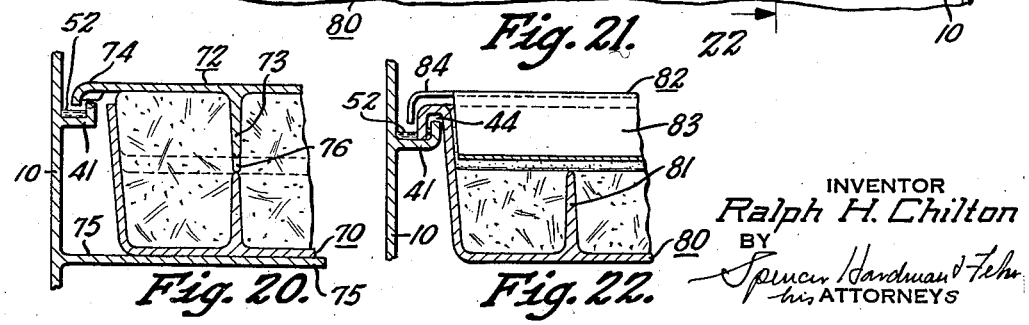

Figs. 18 to 20 show a form of the invention having a metal pan 70 having upstanding integral partitions 71 therein for a part of its depth, and a metal grid 72 having depending integral partitions 73 which match and register with the upstanding partitions 71. In this form preferably both the pan 70 and grid 72 are cast integral with their part depth partitions which preferably are tapered, as shown, so that they may be more readily withdrawn from the ice. The grid 72 has laterally projecting depending flanges 74 whose lower edges contact the ice or non-freezing liquid 52 in the refrigerated channel ledges 41 to provide rapid heat transfer from the grid, all as described in detail above in prior forms. Of course if desired, grid 72 may have straight metal flanges supported upon the plain refrigerated metal ledges 11 as shown in Figs. 1 to 4 and fully described above.

In operation, this form of tray gives very rapid freezing since both the grid 72 and the pan 70 (which rests upon the refrigerated shelf 75) are both arranged to rapidly transfer the heat from the water. Since the partitions 71 and 73 extend only part way through the surrounding water the heat path through the immersed portions of the partitions is shorter and hence the average temperature over the entire area of the partitions will be much colder, with obvious advantages. Fig. 20 shows how the ice in expanding during freezing will lift the grid 72 upward with these resulting advantages: (1) the metal flanges 74 will be broken loose or cleared of contact with any ice or non-freezing liquid retained in the channel ledges 41 and thus greatly facilitate the removal of the tray; (2) the down-tapered partitions 73 will be forced upward, as shown at 76, which tends to loosen the bond between the ice and the various partitions 73 and greatly facilitates the removal of the grid 72 as a unit from the ice, either after a slight thawing action or by a direct pull upon the grid 72 without such thawing. After removal of the grid 72 from pan 70 containing the ice the ice blocks are slightly spaced apart at their upper portions and hence may be easily picked individually from pan 70 after a few moments to permit a slight thawing, or immediately if pan 70 has only a small amount of heat applied to its under surface. Or if desired, the pan 70 may first be removed from the solid mass of ice after some heat is applied to its bottom, whereupon the separate ice blocks may be picked from the grid 72.

Figure 21:
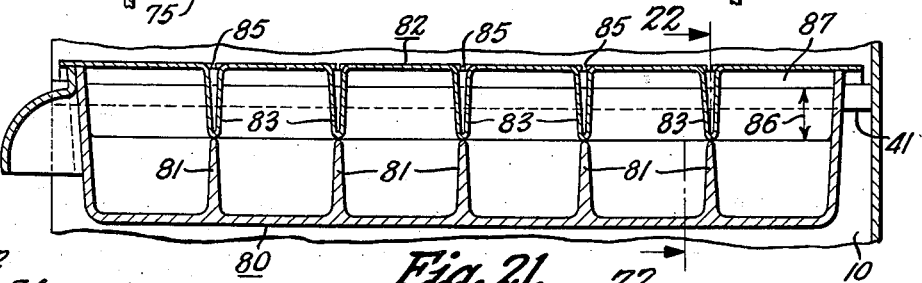

Figs. 21 and 22 show a form of the invention having a metal pan 80 with integral upstanding partitions 81 therein for its partial depth similar to Fig. 18, and a quite flexible metal grid 82 having integral depending transverse partitions 83 which register with the transverse partitions 81 of the pan 80. The metal grid 82 is shown as being directly refrigerated by its flanges 84 which are supported upon the channel ledges 41 as also is the metal pan 80, which support is similar to Figs. 7 to 10 and is fully described above in detail. Obviously if desired, pan 80 can be supported upon a refrigerated shelf, as in the forms of Figs. 18 to 20, and only the grid 82 be supported upon the refrigerated side ledges. The main feature of this form over Figs. 18 to 20 is that the flexible metal grid 82 has no longitudinal partitions but only the integral transverse folds which form the transverse partitions 83. The side flanges 84 have splits 85 opposite all the partitions 83. This renders grid 82 very flexible to facilitate the removal of the ice blocks from the tray. To effect such removal of the ice blocks, the assembled grid and pan and frozen contents may be set upon any warm surface or slight heat applied to the under surface of pan 80 in any desired manner for only a very short time, whereupon the grid 82 together with the ice blocks sticking in place may be lifted bodily from the pan 80 and its relatively short partitions 81. The grid 82 may then be very easily flexed to remove the individual rows of ice blocks therefrom as desired. The ice blocks of each row will still be joined together after such removal by a neck of ice of the depth 86 (see Fig. 21) extending from the tips of partitions 81 to the water level 87. These necks 86 may be easily broken apart since an incipient crack in the ice is already formed at these points. Obviously the space between the surface 87 on the frozen ice blocks and the top plate of grid 82 (as shown in Fig. 21) will greatly aid in the flexing of grid 82 to break its frozen bond to the ice blocks. Of course any other suitable form of flexible metal grid member having only part-depth partitions may be substituted for the specific form of flexible grid 82 shown in the drawings, since in each such case the relatively short depth of the partitions will greatly increase the flexibility of the grid and facilitate the freeing of the ice therefrom by flexing same without the application of heat.

It is to be understood that, in the various forms of the invention described above, any grid member disclosed herein may be used with any pan member disclosed herein since it is not necessary that the pan member be of either metal or flexible non-metallic material in any one form. Preferably high heat-conducting metal such as copper or aluminum is used for the grids and wherever flanges of such metal grids contact mercury the contacting surfaces of these flanges may be plated with a metal, such as iron or chromium or cadmium, which does not tarnish or easily amalgamate with the mercury.

While the embodiment of the present invention as herein disclosed, constitutes a preferred form, it is to be understood that other forms might be adopted, all coming within the scope of the claims which follow.

What is claimed is as follows:

1. In a refrigerator, in combination, a cooling unit having a refrigerated ledge support therein, a removable freezing container adapted to contain water positioned adjacent said support and having a metallic partitioning member therein, said member having metal portions adapted to lie upon and directly contact said refrigerated ledge support when said container is in freezing position and thereby provide a good heat path between said refrigerated support and partitioning member.

2. In a refrigerator, in combination, a cooling unit having a refrigerated ledge support therein, a removable freezing container adapted to contain water positioned adjacent said ledge support and having a metallic partitioning member therein, said member having projecting metal portions which slidably engage said ledge support and are supported thereby when said container is moved to its freezing position.

3. In a refrigerator, in combination, a freezing chamber having stationary refrigerated surfaces at opposed sides thereof, a removable freezing container insertable within said freezing chamber, said container having a removable metal grid having metal portions projecting laterally over the edges of said container and arranged to lie in good heat-transfer relation with said opposed refrigerated surfaces when said container is in its freezing position.

4. In a refrigerator, in combination, a freezing chamber having two opposed refrigerated ledges therein and a tray support, a removable freezing tray adapted to rest upon said support, said tray having a removable metal grid having portions projecting beyond said tray in such manner as to contact said ledges and be supported thereby while said tray rests upon said tray support.

5. In a refrigerator, in combination, a freezing chamber having two opposed refrigerated ledges therein and a tray support, a removable freezing tray adapted to rest upon said support, said tray having a removable metal grid having portions projecting beyond said tray in such manner as to contact said ledges and be supported thereby while said tray rests upon said tray support, the grid being vertically movable from said tray and the arrangement being such that when the contained water in the tray freezes the expansion of the ice will lift said grid projections out of contact with said ledges.

6. The process of freezing ice blocks in a two part mold, comprising: filling with water and assembling the two parts of the mold in contact with the water, positioning the two parts of the mold in individual contact with two spaced refrigerated freezing surfaces so that the upper part of the mold can be moved upwardly and the lower part of the mold is restrained against downward movement, then freezing the water to ice by directly conducting heat therefrom through both of the mold parts to said two spaced refrigerated surfaces and allowing the expansion of the ice during freezing to act upon and lift the upper mold part out of contact with its refrigerated surface, thus partially separating the mold parts.

7. An ice tray having a container pan and a removable metal partitioning member therefor, said partitioning member having portions extending outwardly beyond the edges of said pan and adapted to contact refrigerated surfaces at the sides thereof and form a good heat-transfer path therewith, said pan being dependingly supported from said partitioning member.

8. An ice tray having a container pan and a removable metal partitioning member therefor, both said pan and said partitioning member having laterally extending flanges adjacent their upper side edges and arranged to directly contact refrigerated surfaces at the sides thereof and form a good heat transfer path therewith.

9. An ice tray having a container pan and a removable metal partitioning member therefor, said partitioning member having portions extending outwardly beyond the edges of said pan and arranged to directly contact refrigerated surfaces at the sides thereof and form a good heat-transfer path therewith, said refrigerated surfaces having a covering of anti-freezing liquid retained thereupon.

10. In a refrigerator, in combination, a cooling unit having a refrigerated ledge support therein, a removable freezing pan positioned adjacent said support and having a metallic partitioning member therein, said partitioning member having a metal top plate and depending metal partitions, said top plate having laterally projecting metal flanges supported in good heat-transfer relation upon said refrigerated support when said container is in freezing position.

11. In a refrigerator having two laterally spaced stationary refrigerated surfaces, an ice tray having a container pan and a metal grid, said metal grid having metal partitions immersible in the water contained in said pan and having two laterally opposed projecting flanges extending outwardly beyond the edges of said pan and resting upon said refrigerated surfaces and forming a good heat-transfer path therewith.

12. In a refrigerator having two laterally spaced refrigerating surfaces, an ice tray located between said refrigerated surfaces and having a flexible non-metallic container pan and a metallic partitioning member, said partitioning member having metal partitions immersible in the water contained in said pan and having projecting portions extending outwardly beyond the edges of said pan and contacting said refrigerated surfaces at the sides of said pan and forming a good heat-transfer path therewith.

13. In a refrigerator having two laterally spaced refrigerated surfaces, an ice tray located between said refrigerated surfaces and having a container pan and an inherently flexible metallic partitioning member, said partitioning member having metal partitions immersible in the water contained in said pan and having projecting portions extending outwardly beyond the edges of said pan and contacting said refrigerated surfaces at the sides of said pan and forming a good heat-transfer path therewith.

14. In a refrigerator having two laterally spaced refrigerated surfaces, an ice tray located between said refrigerated surfaces and having a container pan and a removable metal partitioning member therefor, said partitioning member having marginal portions extending outwardly beyond the edges of said pan and contacting said refrigerated surfaces at the sides thereof and forming a goot heat-transfer path therewith.

15. In a refrigerator, in combination, a freezing chamber, a removable freezing tray adapted to be positioned in said chamber, said tray having a container pan and a removable grid inserted into said pan from the open top thereof, means for supporting said pan against downward movement during freezing of its contents, means for extracting heat from said grid more rapidly than from said pan and causing the ice to freeze solid at the upper level prior to freezing solid at the lower portions thereof whereby the upper first-frozen portion of the ice is forced upwardly by the subsequent freezing of the lower portion, and means on said removable grid engaging the first-frozen portion of the ice and causing said grid to be forced upwardly therewith by the subsequent freezing of the lower portion of the ice.

RALPH H. CHILTON.